United States Patent Office 3,042,677
Patented July 3, 1962

3,042,677
THIAZOLIUM QUATERNARY SALTS AND
METHODS OF PREPARING SAME
Edward F. Rogers, Middletown, and Robert L. Clark, Woodbridge, N.J., assignors to Merck & Co., Inc., Rahway, N.J., a corporation of New Jersey
No Drawing. Filed Feb. 2, 1960, Ser. No. 6,106
14 Claims. (Cl. 260—256.5)

This invention relates to novel thiazolium quaternary salts. More particularly, it relates to 3-(2-substituted-4-amino-5-pyrimidylmethyl)-thiazolium and lower alkylated thiazolium quaternary salts and methods of preparing the same. It is also concerned with compositions containing such salts.

According to the present invention novel 3-(2-perfluoroloweralkyl-4-amino-5-pyrimidylmethyl)- and 3-[2-(3,3,3-trifluoropropyl) - 4 - amino - 5 - pyrimidylmethyl]thiazolium and lower alkylated thiazolium quaternary salts are provided. These quaternary salts and particularly those compounds wherein the thiazole ring is substituted in the 2- and/or 4-positions with a lower alkyl group have useful medicinal properties and are particularly suitable for use in the treatment and prevention of coccidiosis in poultry.

The 3-(2-perfluoroloweralkyl - 4 - amino-5-pyrimidylmethyl)-thiazolium and lower alkylated thiazolium quaternary salts of the present invention may be represented by the formula

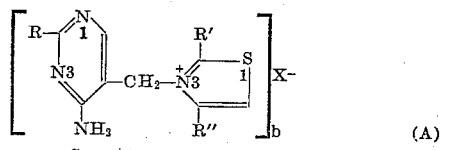

wherein R is a perfluoroloweralkyl radical, R' and R" are hydrogen or lower alkyl, X is an anion, and $b$ is a positive number having a value such that the negative charge of the anion X is neutralized by $b$ moles of cation. Thus, for example, when X is a monovalent anion such as a halide, $b$ is 1.

In like manner, the 3-[2-(3,3,3-trifluoropropyl)-4-amino-5-pyrimidylmethyl]-thiazolium and lower alkylated thiazolium quaternary salts within the purview of this invention may be represented by the formula

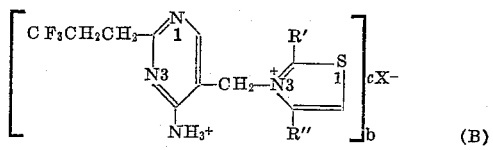

wherein R', R" and X are as previously defined, and $b$ and $c$ are positive numbers having values such that $b$ moles of cation is neutralized by $c$ moles of anion X. Thus, for example, in Formula B above when X is a monovalent anion such as a bromide, $b$ is 1 and $c$ is 2.

As will be apparent from the above structural formulae, the anticoccidial compounds described herein may be considered as substituted thiazoles. The thiazole ring is substituted at the 3-position by a 2-perfluoroloweralkyl-4-amino-5-pyrimidylmethyl or 2-(3,3,3-trifluoropropyl)-4-amino-5-pyrimidylmethyl radical. It may be further substituted at the 2- and/or 4-positions by a lower alkyl radical. The pyrimidine moiety contains at the 2-position of the pyrimidine ring a 3,3,3-trifluoropropyl or perfluoroloweralkyl radical such as perfluoromethyl, perfluoroethyl, perfluoropropyl, perfluoroisopropyl, perfluorobutyl and the like. When more than one lower alkyl group is present in the thiazole ring, that is, when R' and R" are both lower alkyl radicals such lower alkyl radicals need not, of course, be the same in any particular compound.

With further regard to Formulas A and B, the anion (designated as X) may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, embonic, abietic, 2-naphthalenesulfonic or ethylenediamine tetraacetic acids. It may also be the anion of a polymer such as polyphosphate or polystyrenesulfonate ion. The nature of the anion is not critical and any anion may be employed as long as it is not unduly toxic for poultry. However, the anions of the mineral acids and strong organic acids are preferred. It will be readily realized by those skilled in this art that an acid addition salt of the primary amino group present in the compounds represented by Formula B above, namely the 3 - [2 - (3,3,3 - trifluoropropyl) - 4 - amino - 5 - pyrimidylmethyl]-thiazolium and lower alkylated thiazolium quaternary salts, will also be formed concurrently with the quaternary salt. Accordingly, it is to be understood that when the expression "salt" is used in this specification and appended claims to define the quaternary salts represented by Formula B, such expression is being employed to designate the acid addition salt of such quaternary salts.

The compounds of this invention are prepared by reacting together thiazole or an alkylated thiazole compound and an appropriately substituted pyrimidine. As the pyrimidine reactant we may employ an acid addition salt of an ester of a 2-(perfluoroloweralkyl or 3,3,3-trifluoropropyl)-4-amino-5-hydroxymethyl pyrimidine and a strong acid such as a hydrohalic acid. According to the preferred process, a 2-perfluoroloweralkyl-4-amino-5-halomethyl pyrimidine hydrohalide or 2-(3,3,3-trifluoropropyl)-4-amino-5-halomethyl pyrimidine dihydrohalide is reacted directly with the thiazole or alkylated thiazole. This process may be represented as follows:

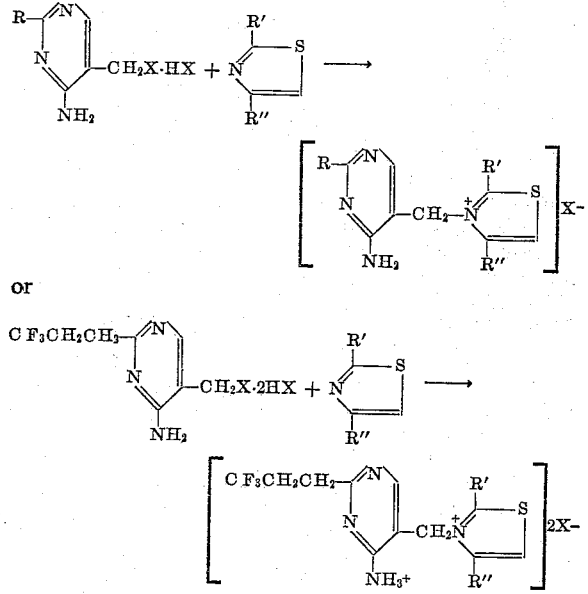

where R is a perfluoroalkyl radical, R' and R" are hydrogen or lower alkyl and X is a halogen such as chlorine or bromine.

Although the proportions of reactants are indicated to be equimolar in the above equations such proportions are not critical and an excess of either reactant can also be suitably reacted. Preferably, however, an excess of the thiazole or alkylated thiazole reactant is employed.

The reaction is preferably, but not necessarily, carried out in the presence of an organic solvent which is inert under the reaction conditions. Illustrative of the solvents which may be employed as the reaction medium are the lower alkanols, such as methanol, ethanol, propanol, and the like, acetonitrile and the N,N-diloweralkyl alkanoamides. The reaction temperature is not critical and it is preferred to carry out the process at about room temperature. At room temperature the reaction is generally complete after room 5–20 hours or more according to the concentration of reactants and particular reactants employed. However, appreciable amounts of the product are obtained after a short period of time. The products precipitate out from the reaction mixture on standing at room temperature or on the addition of a suitable precipitant such as ether, ethyl acetate and the like and can be recovered by filtration or other conventional techniques.

Although the acid addition salt of the 5-hydroxymethyl pyrimidine esters of hydrohalic acids, i.e., the halomethyl pyrimidine hydrohalides or dihydrohalides, are preferably employed for reaction with the thiazole or substituted thiazole, the acid addition salt of the 5-hydroxymethyl pyrimidine esters of other strong inorganic acids such as nitric, phosphoric, sulfuric and the like may be used. In addition, the quaternization may also be brought about employing the acid addition salt of the 5-hydroxymethyl pyrimidine esters of strong organic acids such as the methyl sulfinate, p-toluenesulfonate, benzenesulfonate and naphthalenesulfonate esters.

The quaternization may be conducted so that the particular salt desired is obtained directly or the quaternary salt recovered from the reaction medium may be conveniently metathesized to the desired salt by techniques known in the art.

The prepared compounds of the inention are the 3-2-perfluoroloweralkyl-4-amino-5-pyrimidylmethyl)-
lower alkylated thiazolium and
3-[2-(3,3,3-trifluoropropyl)-4-amino-5-pyrimidylmethyl]-
lower alkylated thiazolium quaternary salts, having a lower alkyl radical in at least the 2- or 4-position in the thiazole ring. Included among these are the 3-(2-perfluoroethyl-4-amino-5-pyrimidylmethyl)-2-
methyl thiazolium salts,
3-(2-perfluoroethyl-4-amino-5-pyrimidylmethyl)-4-methyl
thiazolium salts,
3-(2-perfluoroethyl-4-amino-5-pyrimidylmethyl)-2,4-
dimethyl thiazolium salts,
3-(2-perfluoro-n-propyl-4-amino-5-pyrimidylmethyl)-2-
methyl thiazolium salts,
3-(2-perfluoro-n-propyl-4-amino-5-pyrimidylmethyl)-4-
methyl thiazolium salts,
3-(2-perfluoro-n-propyl-4-amino-5-pyrimidylmethyl)-2,4-
dimethyl thiazolium salts,
3-[2-(3,3,3-trifluoropropyl)-4-amino-5-pyrimidylmethyl]-
2-methyl thiazolium salts and
3-[2-(3,3,3-trifluoropropyl)-4-amino-5-pyrimidylmethyl]-
4-methyl thiazolium salts.

As previously indicated herein, the compounds of this invention are useful in the treatment and prevention of coccidiosis in poultry. These compounds are conveniently fed to poultry as a component of the feed of the animals although they may also be given dissolved or suspended in the drinking water. According to one aspect of the invention, novel compositions are provided in which a thiazolium quaternary salt is present as an active anticoccidial ingredient. Such compositions comprise the quaternary salts intimately dispersed in or admixed with an inert carrier or diluent. By an inert carrier is meant one that is non-reactive with respect to the quaternary and that may be administered with safety to the animals. The carrier or diluent is preferably one that is or may be an ingredient of the animal feed.

The compositions which are a preferred feature of the invention are the so-called feed supplements in which the active ingredient is present in relatively large amounts and which are suitable for addition to the poultry feed directly or after an intermediate dilution or blending step. Examples of carriers or diluents suitable for such compositions are solid orally ingestable carriers such as distillers' dried grains, corn mean, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The quaternary salts are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient are particularly suitable for addition to poultry feeds, and compositions containing from about 5–15% by weight of coccidiostat are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

Examples of typical feed supplements containing a thiazolium quaternary salt dispersed in a solid inert carrier are:

|  | lbs. |
|---|---|
| A. 3-(2-perfluoroethyl-4-amino-5-pyrimidylmethyl)-2-methyl thiazolium chloride | 6.0 |
| Wheat standard middlings | 94.0 |
| B. 3-(2-perfluoroethyl-4-amino-5-pyrimidylmethyl)-4-methyl thiazolium chloride | 10.0 |
| Corn distillers' dried grains | 90.0 |
| C. 3-(2-perfluoroethyl-4-amino-5-pyrimidylmethyl)-2,4-dimethyl thiazolium chloride | 15.0 |
| Wheat standard middlings | 85.0 |
| D. 3-(2-perfluoro-n-propyl-4-amino-5-pyrimidylmethyl)-2-methyl thiazolium bromide | 20.0 |
| Corn germ meal | 30.0 |
| Corn distillers' grains | 50.0 |
| E. 3-(2-perfluoro-n-propyl-4-amino-5-pyrimidylmethyl)-4-methyl thiazolium bromide | 5.0 |
| Fermentation residues | 50.0 |
| Wheat shorts | 45.0 |
| F. Di[3-2-perfluoro-n-propyl-4-amino-5-pyrimidylmethyl)-2,4-dimethyl thiazolium] sulfate | 12.0 |
| Molasses solubles | 88.0 |
| G. 3-[2-(3,3,3-trifluoropropyl)-4-amino-5-pyrimidylmethyl]-2-ethyl thiazolium embonate | 40.0 |
| Ground oyster shells | 60.0 |
| H. 3-[2-(3,3,3-trifluoropropyl)-4-amino-5-pyrimidylmethyl]-4-ethyl thiazolium chloride hydrochloride | 20.0 |
| Corn germ meal | 30.0 |
| Corn distillers' grains | 50.0 |

These and similar feed supplements are prepared by uniformly mixing the thiazolium quaternary salt with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of thiazolium quaternary salt required for optimum control of coccidiosis in poultry will, of course, vary somewhat with the specific compound or compounds employed. In general, the compounds of this invention are effective when administered in concentrations of about 0.0005% to 0.05% in the diet. For most satisfactory results from the standpoint of both efficacy and incidence of undesirable side effects it is preferred that the poultry feed contain between about 0.0025% and 0.025% by weight of thiazolium salt. When the thiazolium salts are to be employed as therapeutic agents, the higher concentrations may be used for relatively short periods of time. Thus, concentrations of about 0.02% to 0.05% by weight of the feed may be advantageously administered in treating an established outbreak of coccidiosis. When these compounds are employed as therapeutic agents it is desirable to employ the lowest levels that afford fully adequate control of coccidiosis in order to eliminate as far as possible any risk of side effects that might appear on prolonged feeding of the compounds.

Many of the thiazolium quaternary salts of this invention are desirably or advantageously administered to poultry by way of the drinking water of the birds. This method of treatment is often employed in the therapeutic use of our compounds since poultry with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat and preparations containing from 1–25% by weight of active compound are suitable.

The following examples are added to illustrate the production of specific compounds provided by this invention but it is understood that the invention is not to be restricted thereby to the embodiments disclosed in these examples.

EXAMPLE 1

*3-(2-Perfluoromethyl-4-Amino-5-Pyrimidylmethyl)-4-Methyl Thiazolium Bromide*

To a solution of 2.7 g. of 2-perfluoromethyl-4-amino-5-pyrimidylmethyl bromide hydrobromide in 10 ml. of methanol is added 4 ml. of 4-methyl thiazole. After allowing the reaction mixture to stand overnight at room temperature the solid 3-(2-perfluoromethyl-4-amino-5-pyrimidylmethyl-4-methyl thiazolium bromide which forms is recovered by filtration, washed with acetone and dried to constant weight.

EXAMPLE 2

*3-(2-Perfluoroethyl-4-Amino-5-Pyrimidylmethyl)-2-Methyl Thiazolium Bromide*

To a stirred suspension of 5.0 g. of 2-perfluoro-ethyl-4-amino-5-pyrimidylmethyl bromide hydrobromide in 50 ml. of acetonitrile is added 10 ml. of 2-methyl thiazole. After allowing the mixture to stand for 20 hours at room temperature the precipitate of 3-(2-perfluoroethyl-4-amino-5-pyrimidylmethyl)-2-methyl thiazolium bromide which forms is recovered by filtration, washed with acetone and dried to constant weight.

EXAMPLE 3

*3-(2-Perfluoroethyl-4-Amino-5-Pyrimidylmethyl)-4-Ethyl Thiazolium Bromide*

The procedure of Example 2 is followed and 5.0 g. of 2-perfluoroethyl-4-amino-5-pyrimidylmethyl bromide hydrobromide suspended in 50 ml. of acetonitrile is reacted with 10 ml. of 4-ethyl thiazole to produce the 3-(2-perfluoroethyl-4-amino-5-pyrimidylmethyl) - 4 - ethyl thiazolium bromide.

EXAMPLE 4

*3-(2-Perfluoro-n-Propyl-4-Amino-5-Pyrimidylmethyl)-4-Methyl Thiazolium Bromide*

To a slurry of 15 g. of 2-perfluoro-n-propyl-4-amino-5-pyrimidylmethyl bromide hydrobromide in 75 ml. of acetonitrile is added 15 ml. of 4-methyl thiazole. The resultant mixture is allowed to stand overnight at room temperature. The solid 3-(2-perfluoro-n-propyl-4-amino-5-pyrimidylmethyl)-4-methyl thiazolium bromide which forms is then removed by filtration, washed with acetone and dried to constant weight.

EXAMPLE 5

*3-(2-Perfluoro-n-Propyl-4-Amino-5-Pyrimidylmethyl)-2,4-Dimethyl Thiazolium Bromide*

To a slurry of 15 g. of 2-perfluoro-n-propyl-4-amino-5-pyrimidylmethyl bromide hydrobromide in 75 ml. of acetonitrile is added 15 ml. of 2,4-dimethyl thiazole. The mixture is then heated at reflux for about 20 hours and then filtered. The solid 3-(2-perfluoro-n-propyl-4-amino-5-pyrimidylmethyl)-2,4-dimethyl thiazolium bromide thus obtained is washed with acetone and dried to constant weight.

EXAMPLE 6

*3-(2-Perfluoroethyl-4-Amino-5-Pyrimidylmethyl)-Thiazolium Chloride*

The procedure of Example 2 is followed and 3.9 g. of 2-perfluoroethyl-4-amino-5-pyrimidylmethyl chloride hydrochloride suspended in 50 ml. of acetonitrile is reacted with 3.5 ml. of thiazole to produce the 3-(2-perfluoroethyl-4-amino-5-pyrimidylmethyl) thiazolium chloride.

EXAMPLE 7

*Di[3-(2-Perfluoroethyl-4-Amino-5-Pyrimidylmethyl-2-Methyl Thiazolium]-1,5-Naphthalene Disulfonate*

4.0 g. of 3-(2-perfluoroethyl-4-amino-5-pyrimidylmethyl)-2-methyl thiazolium bromide is dissolved in 10 ml. of water. To this solution is added 1.5 g. of 1,5-naphthalene disulfonic acid. After allowing the reaction mixture to stand in ice water for 2 hours, the solid di[3-(2-perfluoroethyl-4-amino-5-pyrimidylmethyl)-2-methyl thiazolium]-1,5-naphthalene disulfonate which forms is removed by filtration, washed with water and dried to constant weight.

EXAMPLE 8

*3-(2-Perfluoroethyl-4-Amino-5-Pyrimidylmethyl-4-Methyl Thiazolium Chloride*

1.9 g. of p-toluenesulfonyl chloride is added gradually with shaking to a cooled (0–5° C.) solution of 2.5 g. of 2-perfluoroethyl-4-amino-5-hydroxymethyl pyrimidine in 10 ml. of 4-methyl thiazole. The reaction mixture, after standing three hours in an ice bath and 15 hours at room temperature, is evaporated in vacuo. The residue remaining is then dissolved in 20 ml. of water, acidified with hydrochloric acid and poured over a column of Amberlite IRA–400 ion exchange resin on the chloride cycle. Amberlite IRA–400 (available from the Rohm & Haas Co., Philadelphia, Pa.) which is a strongly basic anion exchange resin containing from 3 to 5% divinylbenzene may be prepared in the manner described in the example of U.S. Pat. No. 2,591,573. The eluate is then evaporated to dryness yielding 3-(2-perfluoroethyl-4-amino-5-pyrimidylmethyl)-4-methyl thiazolium chloride.

EXAMPLE 9

*3-[2-(3,3,3-Trifluoropropyl-4-Amino-5-Pyrimidylmethyl]-2-Methyl Thiazolium Bromide Hydrobromide*

To 5 g. of 2-(3,3,3-trifluoropropyl)-4-amino-5-pyrimidylmethyl bromide dihydrobromide suspended in 25 ml. of acetonitrile is added 5 ml. of 2-methyl thiazole. After allowing the mixture to stand for 15 hours at room temperature sufficient ether is added to precipitate the 3-[2-(3,3,3-trifluoropropyl)-4-amino - 5 - pyrimidylmethyl]-2-methyl thiazolium bromide hydrobromide which is then recovered by filtration, washed with acetone and dried to constant weight.

EXAMPLE 10

6.4 g. of 3-(2-perfluoromethyl-4-amino-5-pyrimidylmethyl)-4-methyl thiazolium bromide is dissolved in 35 ml. of concentrated hydrochloric acid. The resulting solution is filtered and then 500 ml. of acetone is added. The precipitate which forms is then recovered by filtration. This salt is then dissolved in about 8 ml. of concentrated hydrochloric acid and the solution slowly diluted with about 125 ml. of acetone to precipitate the 3-(2-perfluoromethyl-4-amino - 5 - pyrimidylmethyl)-4-methyl thiazolium chloride which is then recovered by filtration and dried to constant weight.

EXAMPLE 11

When the quaternary salts of Examples 2–5 and 9 are treated with hydrochloric acid by the method of Example 10 the corresponding chloride quaternary salts are obtained.

EXAMPLE 12

The 2-(3,3,3 - trifluoropropyl) - 4 - amino-5-halomethyl and 2-perfluoroloweralkyl-4-amino-5-halomethyl pyrimidines employed in making the quaternary compounds of this invention may be prepared in the following manner:

A. *2-[Perfluoroloweralkyl or (3,3,3-Trifluoropropyl)]-4-Amino-5-Bromomethyl Pyrimidine*

5 g. of 2-trifluoromethyl - 4 - amino - 5 - hydroxymethyl pyrimidine is dissolved in 30 ml. of a 30% solution of hydrogen bromide in acetic acid. The resulting mixture is heated at 70° C. for six hours and then allowed to stand at room temperature for 15 hours. The crystalline 2-trifluoromethyl-4-amino-5-bromomethyl pyrimidine hydrobromide which forms is then recovered by filtration, washed with ether and dried to constant weight.

When the above reaction is carried out with 2-perfluoroethyl-4-amino-5-hydroxymethyl pyrimidine there is obtained 2-perfluoroethyl-4-amino-5-bromomethyl pyrimidine hydrobromide. When 2-perfluoro-n-propyl-4-amino-5-hydroxymethyl pyrimidine is employed as the starting material the end product is 2-perfluoro-n-propyl-4-amino-5-bromomethyl pyrimidine hydrobromide. When 2-(3,3,3-trifluoropropyl)-4-amino-5-hydroxymethyl pyrimidine is utilized as the starting compound there is obtained 2-(3,3,3-trifluoropropyl)-4-amino-5-bromomethyl pyrimidine dihydrobromide.

B. *2-[Perfluoroloweralkyl or (3,3,3-Trifluoropropyl)]-4-Amino-5-Hydroxymethyl Pyrimidine*

The 2-trifluoromethyl-4-amino-5-hydroxymethyl pyrimidine employed in part A may be prepared as described by Barone et al. in the J. of Org. Chem. 24, 199 (1959). Barone et al. describe the preparation of the above compound starting with perfluoroacetamidine. When perfluoropropionamidine, perfluorobutyramidine and 4,4,4-trifluorobutyramidine are utilized in this process in place of perfluoroacetamidine, there are obtained respectively 2-perfluoroethyl-4-amino-5-hydroxymethyl pyrimidine, 2-perfluoro-n-propyl-4-amino-5-hydroxymethyl pyrimidine and 2-(3,3,3-trifluoropropyl) - 4 - amino-5-hydroxymethyl pyrimidine.

The perfluoroalkylamidines referred to above may be prepared as described in U.S. Patent No. 2,676,985, issued April 27, 1954. The 4,4,4-trifluorobutyramidine also referred to above may be prepared in the following manner:

(1) A mixture of 100 g. of powdered 4,4,4-trifluorobutyramide (prepared as described by Henne and Stewart, J. Am. Chem. Soc. 77, 1901 (1955)) and 200 g. of phosphorus pentoxide is placed in a distilling flask fitted with a condenser and receiver. The flask is slowly immersed in an oil bath which is maintained at a temperature of 200°–230° C. As the reaction proceeds the 4,4,4-trifluorobutyronitrile which forms distills from the reaction mixture. After 5 hours of heating, vacuum is applied to the system to complete the distillation of the nitrile from the phosphoric acid residue. The crude nitrile obtained is then distilled from 10 g. of phosphorus pentoxide at atmospheric pressure.

(2) To a solution of 86 g. of 4,4,4-trifluorobutyronitrile in 35.4 g. of absolute alcohol maintained at 0° C. is added 28.1 g. of dry hydrogen chloride. The reaction mixture is maintained at 0° C. for four days. 500 ml. of ether is then added and the reaction mixture cooled to about −30° C. The crystalline 4,4,4-trifluorobutyrimido ethyl ester hydrochloride which forms is then recovered by filtration and washed well with ether.

(3) 100 g. of 4,4,4-trifluorobutyrimido ethyl ester hydrochloride is added to a stirred solution of 20 g. of ammonia in 200 ml. of ethanol. After 3 hours at room temperature the reaction mixture is filtered and then concentrated in vacuo to a thick syrup. An equal volume of acetone is then added and the precipitate of 4,4,4-trifluorobutyramidine hydrochloride which forms is recovered by filtration and washed with acetone. This material is then treated with an equal molar amount of sodium ethoxide in ethanol to obtain the free base.

Any departure from the above description which conforms to the present invention is intended to be included within the scope of the claims.

What is claimed is:

1. A thiazolium compound selected from the group consisting of compounds of the formula

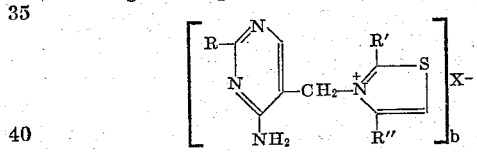

wherein R is a perfluoroloweralkyl radical, R' and R'' are selected from the group consisting of hydrogen and lower alkyl, X is a non-toxic anion, and b is a positive number having a value such that the negative charge of the anion X is neutralized by b moles of cation and

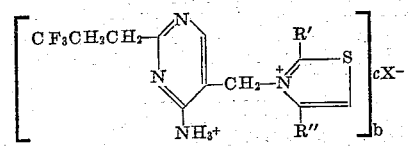

wherein R' and R'' and X are as previously defined, and b and c are positive numbers having values such that the positive charge of b moles of cation is neutralized by c moles of anion X.

2. 3-(2-perfluoroloweralkyl-4-amino-5-pyrimidylmethyl)-thiazolium quaternary salt.

3. 3-(2-perfluoroloweralkyl-4-amino-5-pyrimidylmethyl)-2-lower alkyl thiazolium quaternary salt.

4. 3-(2-perfluoroloweralkyl-4-amino-5-pyrimidylmethyl)-4-lower alkyl thiazolium quaternary salt.

5. 3-(2 - perfluoroloweralkyl - 4 - amino-5-pyrimidylmethyl)-2,4-dilower alkyl thiazolium quaternary salt.

6. 3-[2-(3,3,3-trifluoropropyl)-4-amino - 5 - pyrimidylmethyl]-2-lower alkyl thiazolium quaternary salt.

7. 3-[2-(3,3,3-trifluoropropyl)-4-amino - 5 - pyrimidylmethyl]-4-lower alkyl thiazolium quaternary salt.

8. 3-(2-perfluoroethyl-4-amino-5 - pyrimidylmethyl)-2-methyl thiazolium halide.

9. 3-(2-perfluoroethyl-4-amino-5 - pyrimidylmethyl)-4-methyl thiazolium halide.

10. 3-(2-perfluoroethyl-4-amino-5-pyrimidylmethyl)-2,4-dimethyl thiazolium halide.

11. 3-(2-perfluoro-n-propyl-4-amino-5-pyrimidylmethyl)-2-methyl thiazolium halide.

12. 3-(2-perfluoro-n-propyl-4-amino-5-pyrimidylmethyl)-4-methyl thiazolium halide.

13. The process for preparing compounds of the formula

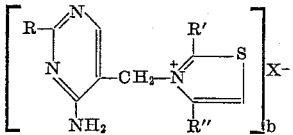

wherein R is a perfluoroloweralkyl radical, R' and R'' are selected from the group consisting of hydrogen and lower alkyl, X is an anion, and $b$ is a positive number having a value such that the negative charge of the anion X is neutralized by $b$ moles of cation which comprises reacting an acid addition salt of a 2-perfluoroloweralkyl-4-amino-5-hydroxymethyl pyrimidine ester of a strong acid with a thiazole compound having the formula

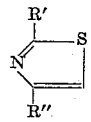

wherein R' and R'' are as previously defined.

14. The process for preparing compounds of the formula

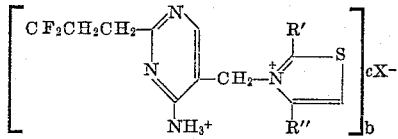

wherein R' and R'' are selected from the group consisting of hydrogen and lower alkyl, X is an anion, and $b$ and $c$ are positive numbers having values such that the positive charge of $b$ moles of cation is neutralized by $c$ moles of anion X which comprises reacting an acid addition salt of a 2-(3,3,3-trifluoropropyl)-4-amino-5-hydroxymethyl pyrimidine ester of a strong acid with a thiazole compound having the formula

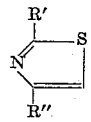

wherein R' and R'' are as previously defined.

References Cited in the file of this patent
UNITED STATES PATENTS

| | | |
|---|---|---|
| 2,146,083 | Miller | Feb. 7, 1939 |
| 2,279,421 | Tisdale | Apr. 14, 1942 |
| 2,799,676 | Maxion | July 16, 1957 |
| 2,833,768 | Fujiwara et al. | May 6, 1958 |